United States Patent [19]
Benson et al.

[11] Patent Number: 6,056,264
[45] Date of Patent: May 2, 2000

[54] SOLENOID ACTUATED FLOW CONTROL VALVE ASSEMBLY

[75] Inventors: Donald J. Benson; Laszlo D. Tikk, both of Columbus; David L. Buchanan, Westport; Byron J. Bunker, Columbus, all of Ind.

[73] Assignee: Cummins Engine Company, Inc., Columbus, Ind.

[21] Appl. No.: 09/195,679

[22] Filed: Nov. 19, 1998

[51] Int. Cl.[7] .................................................. F16K 31/02
[52] U.S. Cl. ................ 251/129.19; 251/129.15; 251/129.21
[58] Field of Search .................. 251/129.19, 129.21, 251/129.16, 129.15

[56] References Cited

U.S. PATENT DOCUMENTS

| | | | |
|---|---|---|---|
| 3,632,081 | 1/1972 | Evans . | |
| 3,871,615 | 3/1975 | Donner | 251/129.19 |
| 4,008,876 | 2/1977 | Bastle . | |
| 4,285,497 | 8/1981 | Güttel . | |
| 4,540,155 | 9/1985 | Redston et al. . | |
| 4,561,632 | 12/1985 | Hügler . | |
| 4,605,197 | 8/1986 | Casey et al. . | |
| 4,765,587 | 8/1988 | Cummins . | |
| 4,840,193 | 6/1989 | Schiel . | |
| 5,467,963 | 11/1995 | Crofts et al. | 251/129.19 X |
| 5,626,325 | 5/1997 | Buchanan et al. . | |
| 5,676,114 | 10/1997 | Tarr et al. . | |

*Primary Examiner*—Kevin Lee
*Attorney, Agent, or Firm*—Nixon Peabody LLP; Charles M. Leedom, Jr.; Tim L. Brackett, Jr.

[57] ABSTRACT

A solenoid actuated valve assembly is provided which achieves accurate control of valve movement while maximizing valve seat life. Specifically, the solenoid actuated flow control valve assembly includes a valve plunger, a solenoid actuator including a coil and an armature, and an armature overtravel feature for permitting continued movement of the armature relative to the valve plunger from an engaged position into a disengaged position when the valve plunger reaches a closed position. The armature overtravel feature includes an overtravel biasing spring for returning the armature from the disengaged position to the engaged position prior to subsequent energization of the actuator coil. As a result, the overtravel feature minimizes the mass impacting the valve seat thereby extending valve seat life while, importantly, avoiding lost motion in the armature during the next actuation cycle thereby minimizing valve response time. The flow control valve also includes an armature protecting feature for minimizing armature wear by preventing the armature from contacting the valve plunger and an armature stop.

20 Claims, 3 Drawing Sheets

SOLENOID ACTUATED FLOW CONTROL VALVE ASSEMBLY

TECHNICAL FIELD

This invention relates generally to an improved solenoid actuated flow control valve assembly for a fuel system which is capable of providing accurate control of valve movement while maximizing valve seat life.

BACKGROUND OF THE INVENTION

Electromagnetically actuated control valves are widely used in fuel injectors and timing fluid and injection fuel metering system for precisely controlling the timing and metering of the injection fuel and timing fluid. Precise control of the timing and metering of fuel and timing fluid is necessary to achieve maximum efficiency of the fuel system of an internal combustion engine. In addition, valve designers continually attempt to reduce the size of the control valves to reduce the overall size and weight of the engine and permit the control valves to be easily mounted in a variety of locations on the engine without exceeding packaging restraints.

Another concern of valve designers is valve seat wear and valve bounce. Control valves are often operated by a solenoid type actuator assembly. The response time of the valve assembly has been decreased by improving the de-energizing response time of the actuator. However, as a result, the valve element closing velocity is increased resulting in increased impact forces on the valve seat. These high impact forces of the valve element against a valve seat cause excessive seat stresses, valve seat beating and excessive wear. Moreover, when the valve impacts the valve seat at a high velocity, the valve tends to bounce off the seat adversely affecting the control of fluid flow and causing additional valve seat wear.

U.S. Pat. No. 5,626,325 discloses a valve assembly designed to reduce valve seat beating. Specifically, the valve assembly includes a compliant web supporting the valve seat to provide a flexing motion when the valve element seats against the valve seat thereby mitigating seat beating. However, this design may not sufficiently reduce valve seat stresses. Also, the movement of the valve seat may undesirably increase valve bounce and interfere with valve sealing.

U.S. Pat. No. 4,765,587 discloses two embodiments of a solenoid valve that reduces the impact force of a valve poppet on a valve seat. The first embodiment discloses a solenoid valve that decouples an armature from a poppet as the poppet impacts a valve seat, thereby reducing seat impact stresses. When an actuator coil is de-energized, a return spring urges the poppet and the armature to move toward the valve seat surface. When the poppet impacts the seat surface, the armature decouples from the poppet and travels an additional distance before abutting a body surface. However, the armature remains separated from the poppet until the next cycle when the energized coil pulls the armature away from the body surface causing it to link with the poppet. This delay in the movement of the poppet upon actuation of the actuator creates an undesirable delay in valve response. Also, the relatively soft armature directly contacts the poppet and the housing thereby possibly causing excessive degradation of the armature.

The second embodiment (FIG. 4) of U.S. Pat. No. 4,765,587 discloses a solenoid valve design utilizing two opposing springs to reduce the pressure on a valve seat when a coil is de-energized. In operation, as the coil is de-energized, a return spring urges an armature and plunger to move toward the valve seat. The spacing between the various parts is such that the valve engages the seat before the armature completes its cycle. The additional force exerted on the valve seat as the armature completes its cycle is absorbed by one of the opposing springs. When energized, the coil urges the armature and plunger away from the valve seat. The return spring is connected to the armature which in turn is linked to the plunger via two continuously compressed opposing springs. This configuration appears to result in the valve remaining in contact with the valve seat for a longer period of time after the coil is energized than if the return spring was connected directly to the plunger. However, again, the armature remains separated from the plunger upon closing of the valve.

Consequently, there is a need for a compact, inexpensive valve assembly capable of effectively controlling valve movement throughout all valve operating conditions while minimizing valve seat stresses.

SUMMARY OF THE INVENTION

An object of the present invention is to overcome the above-noted problems with the prior art and to provide a valve assembly that provides precise control of fluid flow while maximizing valve seat life.

It is another object of the present invention to provide an inexpensive valve assembly which reduces valve seat impact stresses.

It is yet another object of the present invention to provide a valve assembly which is compact and constructed of a minimal number of parts.

A further object of the present invention is to provide a solenoid operated control valve assembly capable of minimizing valve response time while minimizing valve seat beating and wear.

A still further object of the present invention is to provide a solenoid operated control valve assembly which minimizes the mass of the valve and armature assembly upon closing contact with the valve seat.

Yet another object of the present invention is to provide an inexpensive solenoid operated control valve assembly which separates the armature from the valve member upon closing while returning the armature to operative abutment with the valve member prior to the next cycle to minimize response time.

It is yet another object of the present invention to provide a control valve assembly which integrates an armature stop into a valve housing containing fuel passages.

Still another object of the present invention is to provide a control valve assembly capable of protecting the armature from excessive wear due to direct contact with surfaces of greater hardness, such as an armature stop and valve plunger.

These and other objects are achieved by providing a flow control valve for controlling the flow of fuel in a fuel system, comprising a valve housing including an inlet passage and an outlet passage, a valve plunger mounted in the valve housing for reciprocal movement between an open position permitting fuel flow from the inlet passage to the outlet passage and a closed position blocking flow through the outlet passage, and an actuator for moving the valve plunger between the open and closed positions. The actuator includes a solenoid assembly including a coil capable of being energized to move the valve plunger into the open position and an armature mounted on the valve plunger for movement with the valve plunger toward the closed position. An armature overtravel feature is provided for permitting continued movement of the armature relative to the valve plunger from an engaged position into a disengaged position when the valve plunger reaches the closed position. The armature overtravel feature includes an overtravel biasing device for returning the armature from the disengaged position to the engaged position prior to subsequent energization of the coil. A valve seat may be formed on the valve housing for sealing engagement by the valve plunger. The overtravel biasing device may be positioned axially between the valve seat and the armature. The overtravel biasing device may include a coil spring extending around the valve plunger.

An armature stop may also be provided adjacent the armature for limiting the movement of the armature relative to the valve plunger. The valve housing may include a one-piece armature housing and the outlet passage may be formed in the armature housing. The armature stop may be formed integrally on the one-piece armature housing. The one-piece armature housing may include a recess for receiving the armature which includes an inner bottom surface. The integral armature stop may project outwardly from the inner bottom surface of the recess.

The flow control valve of the present invention may further include an armature protecting feature mounted adjacent the armature for preventing the armature from contacting one of the valve plunger and the armature stop so as to prevent wear and damage to the relatively soft armature potentially caused by repeated contact with the plunger and armature stop which are formed of harder materials. The armature protecting feature may include a shim mounted on the armature between the armature and the armature stop. Also, the armature protecting feature may include an armature sleeve connected to the armature and positioned between the armature and the valve plunger.

DETAILED DESCRIPTION OF THE PREFERRED EMBODIMENT

Figure 1:
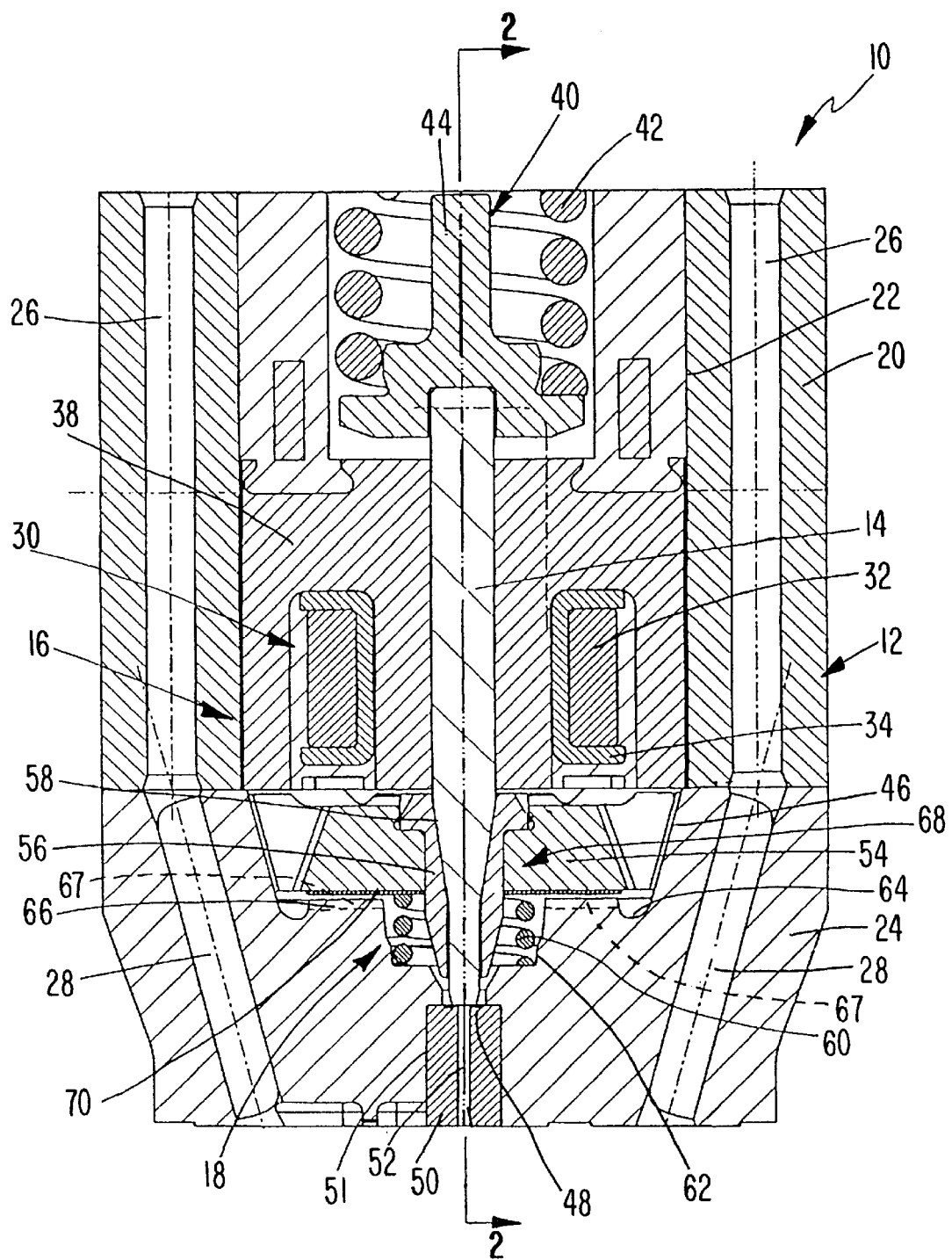
FIG. 1 is a cross sectional view of the solenoid operated control valve of the present invention.
Figure 2:
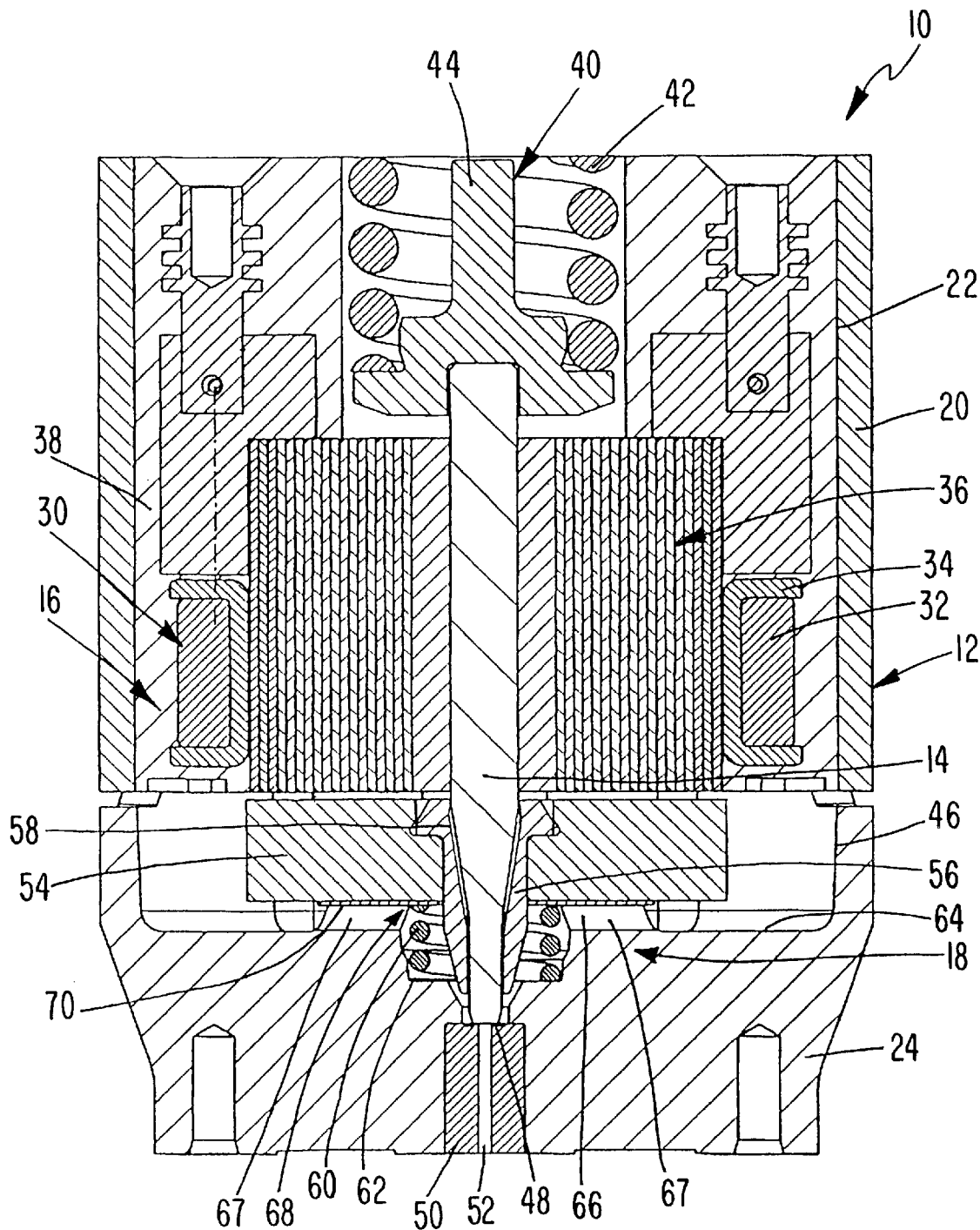
FIG. 2 is a cross sectional view of the control valve of the present invention taken along plane 2—2 in FIG. 1.
Figure 3A:
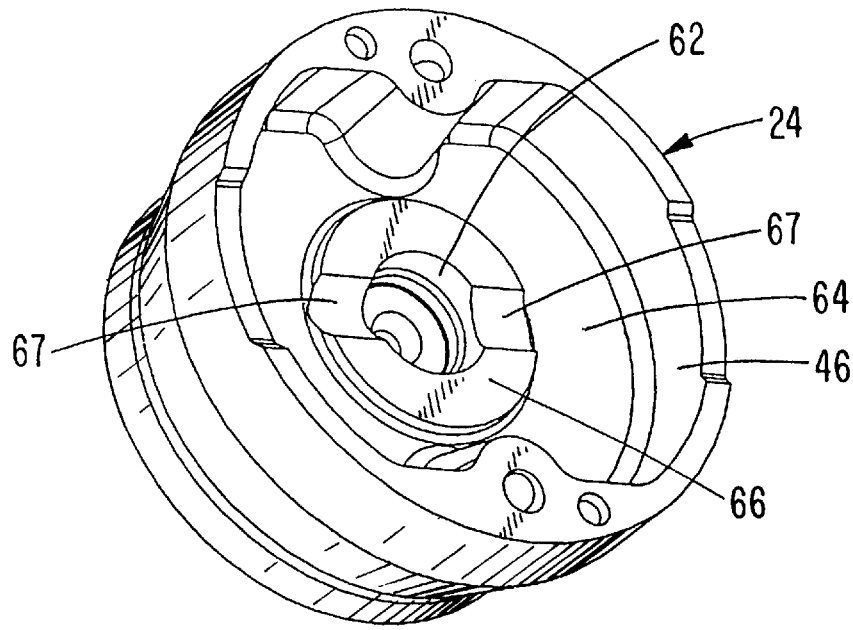
FIGS. 3a and 3b are top and bottom perspective views, respectively, of the one-piece armature housing of the flow control valve of the present invention.
Figure 3B:
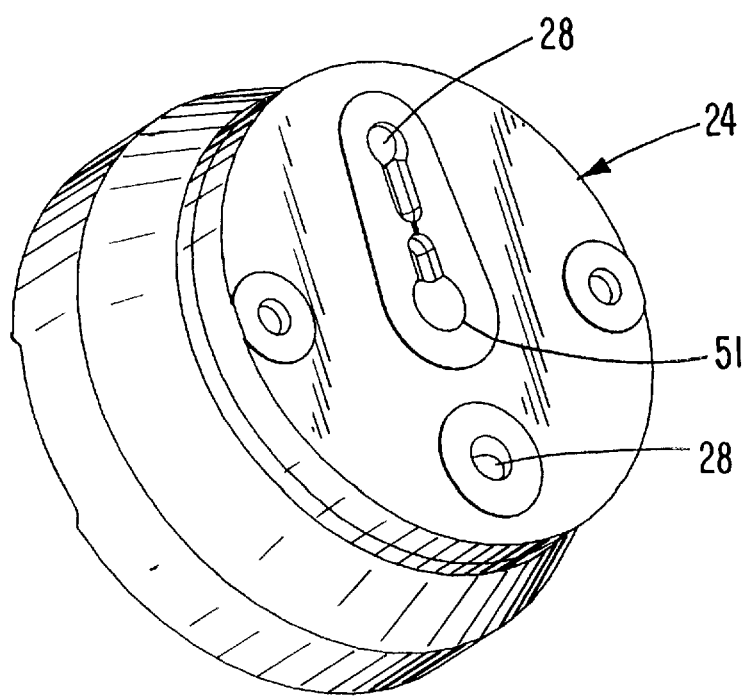

Referring to FIGS. 1 and 2, there is shown the fluid control valve of the present invention, indicated generally at 10, for effectively controlling the flow of a fluid in a fluid system, such as the flow of fuel through a fuel injection system in an internal combustion engine. Flow control valve 10 generally includes a valve housing 12, a valve plunger 14 mounted for reciprocal movement in valve housing 12, a valve actuator assembly 16 for selectively moving valve plunger 14 between open and closed positions and an armature overtravel feature indicated generally at 18. The combination of features of flow control valve 10 discussed hereinbelow create a compact, inexpensive valve assembly capable of effectively and precisely controlling fluid flow while minimizing valve seat wear during operation.

Valve housing 12 includes an upper portion 20 containing a cavity 22 and a lower one-piece armature housing 24 mounted in compressive abutment against a lower surface of upper portion 20. Upper portion 20 may include fuel passages 26 extending axially therethrough for communication with respective fuel passages 28 formed in one-piece actuator housing 24 for delivering fuel, for example, from a high pressure fuel source to an injector nozzle assembly mounted adjacent one-piece armature housing 24. Flow control valve 10 is preferably utilized in a fuel system and, in the preferred embodiment of FIGS. 1 and 2, is readily positionable in the lower portion of a fuel injector, such as disclosed in U.S. Pat. No. 5,676,114, the entire contents of which is hereby incorporated by reference.

Actuator 16 includes a solenoid assembly 30 including a coil 32 mounted on a bobbin 34 and extending around a stator assembly 36 (FIG. 2). Solenoid assembly 30 is positioned in cavity 22 and securely attached to upper portion 20 of valve housing 12, preferably, by a nonmetallic overmold 38, i.e. a plastic material, injected into the space between the solenoid assembly and the inner surface of upper portion 20, as generally described in U.S. patent application Ser. No. 084,018 filed May 26, 1998 and entitled Solenoid Actuator Assembly, the entire contents of which is hereby incorporated by reference. Valve plunger 14 is mounted for reciprocal movement in an aperture extending through overmold 38. A spring retainer and stop device 40 is mounted on the outer end of valve plunger 14 for receiving a bias spring 42 for biasing valve plunger 14 downwardly as shown in FIG. 1. Spring retainer and stop device 40 also includes a cylindrical stop 44 for abutment against an opposing surface (not shown) during outward movement of valve plunger 14 to thereby limit the outer movement of valve plunger 14.

One-piece armature housing 24 includes a recess 46 opening toward coil 32 and stator assembly 36. Valve plunger 14 extends through recess 46 to contact a valve seat 48 formed on a valve seat insert 50 positioned in a receiving cavity 51 and fixedly attached to one-piece actuator housing 24. An inlet passage 52 is formed in valve seat insert 50 so that positioning of valve plunger 14 in the closed position, as shown in FIG. 1, blocks fuel flow through inlet passage 52. Solenoid assembly 30 also includes an armature 54 mounted on valve plunger 14 for movement with valve plunger 14 toward the closed position. Energization of coil 32 creates an attractive force between stator assembly 36 and armature 54 causing armature 54 to move toward stator assembly 36 thereby lifting valve plunger 14 off valve seat 48 into an open position.

Armature overtravel feature 18 includes a movable connection between valve plunger 14 and armature 54 to permit continued movement of armature 54 relative to valve plunger 14 when valve plunger 14 moves into a closed position as described more fully hereinbelow. Specifically, an armature sleeve 56 is positioned in an internal bore extending through armature 54 and fixedly attached to armature 54 by, for example, an interference fit between sleeve 56 and armature 54. Armature sleeve 56 includes a central bore 58 for receiving valve plunger 14. Armature overtravel feature 18 further includes an overtravel biasing spring 60 mounted in a spring chamber 62 formed in an inner bottom surface 64 of recess 46. Biasing spring 60 is a coil spring which seats against one-piece armature housing 24 at one end and biases armature 54 and armature sleeve 56 into an engaged position against plunger 14 at an opposite end. Thus, as described more fully hereinbelow with respect to the operation of the valve 10, armature 54 is permitted to move from an engaged position, as shown in FIG. 1, to a disengaged position, as shown in FIG. 2, upon valve plunger 14 impacting valve seat 48. However, overtravel biasing spring 60 returns armature 54 to the engaged position in preparation for the next actuation cycle.

Flow control valve 10 also includes an armature stop 66 formed on one-piece armature housing 24 and extending outwardly from inner bottom surface 64. Armature stop 66 functions to limit the disengaging movement of armature 54 from valve plunger 14 as valve plunger 14 impacts valve seat 48 as shown in FIG. 2. Armature stop 66 is integrally formed on one-piece armature housing 24 thereby reducing the number of parts required for the assembly. A plurality of outlet passages or grooves 67 are formed in armature stop 66 to direct the outlet flow to a low pressure drain. Importantly, an armature protection feature, indicated generally at 68, is also provided for preventing the armature from contacting surfaces of the assembly having a higher degree of hardness than the armature material thereby minimizing armature wear. Armature protection feature 68 includes a shim 70 positioned between armature 54 and armature stop 66 to protect armature stop 66 in the event armature 54 moves into the disengaged position as shown in FIG. 2. It should be noted that during normal operation, shim 70 will not contact armature stop 66 but remain separated by a fluid film. However, there may be conditions under which contact may occur, such as a diagnostics procedure wherein little or no fluid exists in the valve. Shim 70 also functions as a spring seat for overtravel biasing spring 60. Thus, shim 70 functions to prevent undesirable wear of armature 54 due to contact with armature stop 66 and spring 60 by separating armature 54 from stop 66 and spring 60. Shim 70 is preferably formed of a material having a greater degree of resistance to wear than the material of armature 54. Armature protection feature 68 also includes armature sleeve 56. Sleeve 56 is also formed of a material having a greater resistance to wear than armature 54. As plunger 14 and armature 54 move between the engaged position of FIG. 1 and the disengaged position of FIG. 2, shim 70 and armature sleeve 56 contact armature stop 66 and plunger 14, respectively, thereby avoiding stress and wear on armature 54.

Importantly, armature overtravel feature 18 ultimately functions to reduce valve seat impact stresses and wear by reducing the mass of the plunger and armature combination impacting the valve seat 48. Specifically, the mass is reduced by allowing armature 54, which represents a majority of the moving mass, to separate from the valve plunger 14 when plunger 14 impacts valve seat 48. As a result, the mass of armature 54 is not a contributor to the force applied to valve seat 48 upon impact since armature 54 separates from plunger 14 and continues to move toward armature stop 66. As a result, the response time of the valve is optimized since energization of coil 32 causes simultaneous movement of both armature 54 and valve plunger 14 without a time delay for moving armature 54 back into the engaged position.

During operation, with actuator 16 de-energized, valve plunger 14 is positioned in the closed position against valve seat 48 blocking flow from inlet passage 52 to outlet passage 67. Also, armature 54 and armature sleeve 56 are biased into the engaged position against valve plunger 14 by overtravel biasing springs 60. As a result, a gap exists between armature stop 66 and shim 70. Solenoid assembly 30 is provided with an electrical signal from an electronic control module (ECM—not shown) via a conventional terminal connection at a predetermined time to energize solenoid assembly 30 causing armature 54 and valve plunger 14 to move from the closed position shown in FIG. 1, upwardly toward an open position allowing fuel flow between the lower end of valve plunger 14 and valve seat 48. As a result, fuel flows from inlet passage 52 to, for instance, a low pressure drain, via outlet passage 67. After a predetermined period of time, solenoid assembly 30 is de-energized. As the electromagnetic force decreases, armature 54, armature sleeve 56, shim 70, valve plunger 14 and spring retainer and stop device 40 begin to travel as an assembly toward valve seat 48. As the assembly accelerates, the fluid pressure between armature 54 and armature stop 66 increases. Meanwhile, the fluid pressure between armature 54 and stator assembly 36 decreases. The fluid pressure between armature 54 and armature stop 66 continues to increase as the assembly moves toward valve seat 48 thereby acting to decelerate the assembly. When valve plunger 14 impacts valve seat 48, the motion of valve plunger 14 is rapidly decelerated while an impact force is imparted to valve seat 48. However, armature 54, armature sleeve 56 and shim 70 are not coupled to plunger 14 and therefore continue to move downwardly, as shown in FIG. 2, as armature sleeve 56, in effect, separates from valve plunger 14. The armature, armature sleeve and shim assembly continues to decelerate as shim 70 approaches armature stop 66. The dominant force producing this deceleration is produced by the fluid pressure between shim 70 and armature stop 66. The increase in the fluid pressure force between shim 70 and armature stop 66 is sufficient to stop the motion of the armature before shim 70 impacts armature stop 66. As a result, this fluid pressure assists in bringing the armature assembly to a disengaged position against armature stop 66 without damaging impact forces as shown in FIG. 2. Although FIG. 2 appears to illustrate shim 70 in contact with armature stop 66, a fluid film actually prevents contacts between the components under normal conditions. Overtravel biasing spring 60 then moves armature 54, shim 70 and armature sleeve 56 back into the engaged position against plunger 14 as shown in FIG. 1.

The present invention results in various advantages over conventional control valve assemblies. First, armature overtravel feature 18 effectively reduces the mass of the assembly impacting the valve seat thereby reducing the impact force against the valve seat and thus decreasing valve seat stress, wear and valve bounce. Second, overtravel biasing spring 60 effectively minimizes valve response time by returning armature 54, armature sleeve 56 and shim 70 to the engaged position prior to the next actuation event. Thus, upon actuation of solenoid assembly 30 during the next cycle of operation, any movement in armature 54 results in corresponding movement of valve plunger 14 unlike conventional valve assemblies which rely on the retractive force between the stator and armature to move the armature back into the engaged position during the next cycle. Thus, overtravel biasing spring 60 of the present invention avoids the lost motion of the armature during each cycle thereby reducing the response time of the assembly resulting in more predictable and accurate control over fuel flow. Third, armature protection feature 68 of the present invention effectively protects armature 54 from impact stresses and wear by preventing armature 54 from contacting harder components of the assembly.

Industrial Applicability

The control valve of the present invention may be utilized in any system requiring the ability to control the flow of fluid between a source and a load, especially where very precise control of fluid flow is desired. Specifically, the control valve of the present invention is particularly suited for use in a fuel system of an internal combustion engine and, specifically, for use in a fuel injector.

We claim:

1. A flow control valve for controlling the flow of fuel in a fuel system, comprising:

a valve housing including an inlet passage and an outlet passage;

a valve plunger mounted in said valve housing for reciprocal movement between an open position permitting fuel flow from said inlet passage to said outlet passage and a closed position blocking flow through said outlet passage;

an actuator means for moving said valve plunger between said open and closed positions, said actuator means including a solenoid assembly including a coil capable of being energized to move said valve plunger into said open position and an armature mounted on said valve plunger for movement with said valve plunger toward said closed position; and an armature overtravel means for permitting continued movement of said armature relative to said valve plunger from an engaged position into a disengaged position when said valve plunger reaches said closed position, said armature overtravel means including an overtravel biasing means for returning said armature from said disengaged position to said engaged position prior to subsequent energization of said coil.

2. The flow control valve of claim 1, further including a valve seat formed on said valve housing for sealing engagement by said valve plunger, said overtravel biasing means being positioned axially between said valve seat and said armature.

3. The flow control valve of claim 2, wherein said overtravel biasing means includes is a coil spring extending around said valve plunger.

4. The flow control valve of claim 1, further including an armature stop positioned adjacent said armature for limiting the movement of said armature relative to said valve plunger.

5. The flow control valve of claim 4, wherein said valve housing includes a one-piece armature housing, said outlet passage formed in said armature housing, said armature stop formed integrally on said one-piece armature housing.

6. The flow control valve of claim 5, wherein said one-piece armature housing includes a recess for receiving said armature, said recess including an inner bottom surface, said integral armature stop projecting outwardly from said inner bottom surface.

7. The flow control valve of claim 1, further including an armature protecting means mounted adjacent said armature for preventing said armature from contacting one of said valve plunger and said armature stop.

8. The flow control valve of claim 7, wherein said armature protecting means includes a shim mounted on said armature between said armature and said armature stop.

9. The flow control valve of claim 7, wherein said armature protecting means includes an armature sleeve connected to said armature and positioned between said armature and said valve plunger.

10. A flow control valve for controlling the flow of fuel in a fuel system, comprising:

a valve housing including an inlet passage and an outlet passage;

a valve plunger mounted in said valve housing for reciprocal movement between an open position permitting fuel flow from said inlet passage to said outlet passage and a closed position blocking flow through said outlet passage;

an actuator means for moving said valve plunger between said open and closed positions, said actuator means including a solenoid assembly including a coil capable of being energized to move said valve plunger into said open position and an armature mounted on said valve plunger in an engaged position for movement with said valve plunger toward said closed position and movement relative to said valve plunger into a disengaged position when said valve plunger reaches said closed position; and an overtravel biasing spring for returning said armature from said disengaged position to said engaged position prior to subsequent energization of said coil.

11. The flow control valve of claim 10, further including a valve seat formed on said valve housing for sealing engagement by said valve plunger, said overtravel biasing spring being positioned axially between said valve seat and said armature, said overtravel biasing spring being a coil spring extending around said valve plunger.

12. The flow control valve of claim 10, further including an armature stop positioned adjacent said armature for limiting the movement of said armature relative to said valve plunger, said valve housing including a one-piece armature housing, said armature stop formed integrally on said one-piece armature housing.

13. The flow control valve of claim 12, wherein said one-piece armature housing includes a recess for receiving said armature, said recess including an inner bottom surface, said integral armature stop projecting outwardly from said inner bottom surface.

14. The flow control valve of claim 10, further including an armature protecting means mounted adjacent said armature for preventing said armature from contacting one of said valve plunger and said armature stop.

15. The flow control valve of claim 14, wherein said armature protecting means includes a shim mounted on said armature between said armature and said armature stop, and an armature sleeve connected to said armature and positioned between said armature and said valve plunger.

16. A flow control valve for controlling the flow of fuel in a fuel system, comprising:

a valve housing including an inlet passage and an outlet passage;

a valve plunger mounted in said valve housing for reciprocal movement between an open position permitting fuel flow from said inlet passage to said outlet passage and a closed position blocking flow through said outlet passage;

an actuator means for moving said valve plunger between said open and closed positions, said actuator means including a solenoid assembly including a coil capable of being energized to move said valve plunger into said open position and an armature mounted on said valve plunger for movement with said valve plunger toward said closed position and movement relative to said valve plunger when said valve plunger reaches said closed position;

an armature stop positioned adjacent said armature for limiting the movement of said armature relative to said valve plunger; and an armature protection means mounted adjacent said armature for preventing said armature from contacting one of said valve plunger and said armature stop.

17. The flow control valve of claim 16, further including an overtravel biasing spring for returning said armature from a disengaged position to an engaged position prior to subsequent energization of said coil.

18. The flow control valve of claim 16, wherein said valve housing includes a one-piece armature housing, said inlet passage formed in said one-piece armature housing, said one-piece armature housing including a recess for receiving said armature, said recess including an inner bottom surface, said armature stop integrally formed on, and projecting outwardly from, said inner bottom surface.

19. The flow control valve of claim 16, wherein said armature protection means includes a shim mounted on said armature between said armature and said armature stop.

20. The flow control valve of claim 19, wherein said armature protection means includes an armature sleeve connected to said armature and positioned between said armature and said valve plunger.

* * * * *